US008045235B2

(12) United States Patent
Nakai et al.

(10) Patent No.: US 8,045,235 B2
(45) Date of Patent: Oct. 25, 2011

(54) METHOD OF ADDING SPECIFIC IMAGE INFORMATION AND IMAGE FORMING APPARATUS

(75) Inventors: Yoshiyuki Nakai, Nara (JP); Koichi Sumida, Nara (JP); Takao Yamanouchi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 545 days.

(21) Appl. No.: 11/656,324

(22) Filed: Jan. 19, 2007

(65) Prior Publication Data

US 2007/0206866 A1    Sep. 6, 2007

(30) Foreign Application Priority Data

Mar. 2, 2006    (JP) ................................. 2006-055991

(51) Int. Cl.
*H04N 1/40* (2006.01)

(52) U.S. Cl. ....... 358/3.28; 358/464; 358/448; 358/443; 358/449; 358/400; 726/1; 726/36; 382/232; 382/287; 235/462.03; 283/93

(58) Field of Classification Search .................. 358/464, 358/448, 443, 449, 400; 726/1–36; 382/232
See application file for complete search history.

(56) References Cited

U.S. PATENT DOCUMENTS

| | | | | |
|---|---|---|---|---|
| 5,796,869 A | * | 8/1998 | Tsuji et al. | 382/203 |
| 5,798,844 A | | 8/1998 | Sakano et al. | |
| 6,298,150 B1 | * | 10/2001 | Sonoda et al. | 382/162 |
| 6,370,271 B2 | | 4/2002 | Fu et al. | |
| 6,400,470 B1 | * | 6/2002 | Takaragi et al. | 358/448 |
| 6,888,962 B1 | | 5/2005 | Sonoda et al. | |
| 2003/0099394 A1 | * | 5/2003 | Shimazawa | 382/164 |
| 2005/0041263 A1 | * | 2/2005 | Ishikawa et al. | 358/1.14 |

FOREIGN PATENT DOCUMENTS

| | | |
|---|---|---|
| JP | 07-038737 | 2/1995 |
| JP | 09-016043 | 1/1997 |
| JP | 2000-307857 | 11/2000 |
| JP | 2000-333005 | 11/2000 |

* cited by examiner

*Primary Examiner* — Benny Tieu
*Assistant Examiner* — Martin Mushambo
(74) *Attorney, Agent, or Firm* — David G. Conlin; Steven M. Jensen; Edwards Angell Palmer & Dodge LLP

(57) ABSTRACT

Provided are a specific image information adding method with enhanced detection accuracy enabling multiple pieces of information to be added, and an image forming apparatus using the method. In the method of adding specific image information about a recorded image onto the recorded image, the specific image information consists of reference information and identification information, the reference information is formed so as to be able to set a reference position for reading of the specific image information, and the identification information is formed from dot images indicative of bit information at predetermined positions on an arc or a circumference around the reference position. The identification information can represent a single information item by a plurality of dot images, which are placed on a plurality of different arcs or circumferences and arranged at predetermined spacings in the circumferential direction and in the radial direction.

9 Claims, 7 Drawing Sheets

METHOD OF ADDING SPECIFIC IMAGE INFORMATION AND IMAGE FORMING APPARATUS

CROSS-NOTING PARAGRAPH

This Nonprovisional application claims priority under 35 U.S.C. §119(a) on Patent Application No. 2006-055991 filed in JAPAN on Mar. 2, 2006, the entire contents of which are hereby incorporated herein by references.

FIELD OF THE INVENTION

The present invention relates to a method of adding specific image information to image data of a document, and an image forming apparatus using the method.

BACKGROUND OF THE INVENTION

To prevent unauthorized copying of a document composed of image data, an image of a specific pattern (hereinafter, specific image information) such as a background pattern is added to or combined with the document. This specific image information is also referred to as copy prohibiting information or copy preventing information. In addition to this, by implanting various types of management information such as date of a serial number of a copying machine, a document manager, and a copy available limit expiry date into the image data of the document as hidden information, management is made possible.

The specific image information described above is, in some case, attached to the document in such a state as to be indiscernible to a user and in other case, attached to the document in such a state as to be sufficiently discernible to the user as the specific image information to restrain copying etc. However, irrespective of whether the specific image information is discernible to the user or not, when for example, the user attempts to copy the document with the specific image information added thereto using a copying machine, etc., the machine performs an operation such as prohibiting the document from being copied or printed or outputting information of "copy prohibited".

Various types of technologies are proposed as technologies for adding the specific image information into the document, for example, Japanese Laid-Open Patent Publication No. H07-038737 discloses a copying machine designed to easily prepare a document with a specific mark added thereto. In this patent application, the copying machine comprises a specific mark generating means for reproducing an image by adding a specific mark to a document image, a mark presence detecting means for detecting presence or absence of the specific mark in the read document image, and a controlling means for causing a copying operation to differ from the operation in an ordinary manner when the mark presence detecting means detects the specific mark from the document image.

Japanese Laid-Open Patent Publication No. 2000-307857 discloses printing of a candidate image of a specific pattern in a checkered manner on the back side of a document without impairing readability of the document. It also discloses judging of whether the detected candidate image of the specific pattern is the specific image information, by examining positional arrangement of the detected candidate image of the specific pattern and prohibiting an operation of copying, etc., in the case of the specific image information. Japanese Laid-Open Patent Publication No. H09-016043 discloses the technology of providing the specific image information divided into a plurality of colors and, at the time of detection, combining extracted results of the plurality of colors into one and accurately detecting the specific image information based on such results.

Copy prohibiting or detailed information on the read document is extracted by, generally, inclusive of the above prior techniques, adding (printing) a specific pattern image (specific image information) to image data of a document, reading the printed image data and detecting the specific image information from the read image data. In another instance, one document may include plural pieces of management information such as a serial number of a copying machine, a document manager, a copy available limit.

The specific image information embedded in image data has, however, limited color and size for the purpose of avoiding interference with the document image data, so that it is not easy to detect the specific image information added thereto with low detection accuracy, making it difficult to include a lot of management information.

SUMMARY OF THE INVENTION

An object of the present invention is to provide a method of adding specific image information and an image forming apparatus, with an enhanced detection accuracy, enabling multiple pieces of information to be added.

The adding method of specific image information according to the present invention is a method of adding specific image information about a recorded image onto the recorded image, the specific image information consisting of reference information and identification information, the method comprising forming the reference information so as to set a reference position for reading of the specific image information and forming the identification information from dot images indicative of bit information at predetermined positions on an arc or a circumference around the reference position.

In the method of adding specific image information described above, the identification information can represent a single information item by a plurality of dot images, which are placed on a plurality of different arcs or circumferences and arranged at predetermined spacings in the circumferential direction and in the radial direction. Furthermore, the reference information and the identification information may be formed with different colors. The same specific image information may be added at a plurality of locations.

PREFERRED EMBODIMENTS OF THE INVENTION

Figure 1:
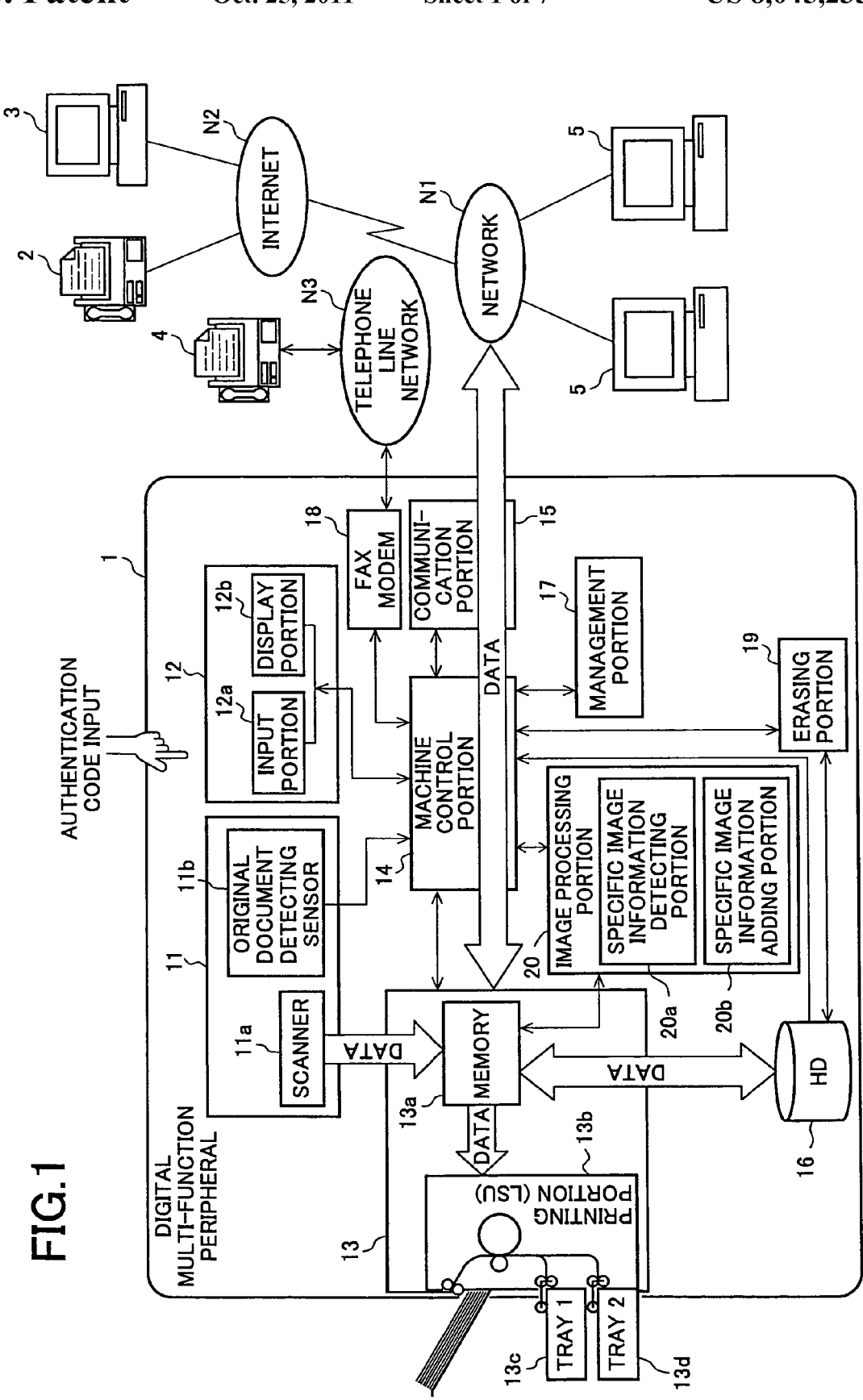
FIG. 1 is an explanatory block diagram of an example of an image forming apparatus (digital multi-function peripheral) to which a method of adding specific image information of the present invention is applied.

Description will be made of embodiments of the present invention, with reference to drawings. FIG. 1 is a block diagram of an example of an image forming apparatus (digital multi-function peripheral) to which a management information adding method of the present invention is applied. The digital multi-function peripheral 1 is connected to a plurality of personal computers (PC) 5 by way of a communication network N1 such as an in-house LAN and can exchange information with the PC 5. The digital multi-function peripheral 1 is also connected to a wide-area communication network N2 such as Internet to transmit and receive information to and from an external facsimile device 2 and an external PC 3, and can also communicate with other facsimile device 4 through a telephone line network N3.

This digital multi-function peripheral 1 has a plurality of functions, for example, as a copying machine, a printing device, a facsimile device and a scanning device, etc. The digital multi-function peripheral 1 is equipped with a machine control portion 14 comprising a CPU for arithmetic processing, a RAM for temporary storage of processing information, a ROM for storage of a control program, etc. This machine control portion 14 connects with a management portion 17 that stores management control information (various kinds of control information) that manages the processing performed by the digital multi-function peripheral 1 and with an image reading portion 11 that generates image data by reading an image, etc., recorded on recording paper. The image reading portion 11 has a scanner 11a for capturing the image data of a document and an original document detecting sensor 11b for detecting presence or absence of the document.

The machine control portion 14 connects with an image forming portion 13 that forms the image data on the recording paper. The image forming portion 13 is equipped with a memory 13a for temporary storage of read image data, a printing portion (LSU) 13b that forms the image from the image data stored in the memory 13a and prints the image on the recording paper, and trays 13c and 13d for feeding the recording paper to the printing portion 13b. By this configuration, the digital multi-function peripheral 1 serves as a copying machine that, after storing the image data generated at the image reading portion 11 in the memory 13a, forms the image at the printing portion 13b.

The machine control portion 14 is connected to a FAX modem 18 to transmit and receive to and from the facsimile device 4 by way of the telephone line network N3. Therefore, the machine control portion 14 can transmit the image data generated at the image reading portion 11 from the FAX modem 18 to other facsimile device 4 by way of the telephone line network N3. The machine control portion 14 can also receive the image data transmitted by other facsimile device 4 at the FAX modem 18 and form the image at the image forming portion 13. Namely, the digital multi-function peripheral 1 serves as a facsimile device.

Furthermore, because of its capability to transmit the image data read at the image reading portion 11 to the PC 5 by way of a communication portion 15, the digital multi-function peripheral 1 serves as a scanning device as viewed from the PC 5. Also, because of its capability to receive the image data transmitted by the PC 5 at the communication portion 15 and form the image from the received image data at the image forming portion 13, the digital multi-function peripheral 1 can also serve as a printing device as viewed from the PC 5.

The communication network N1 is further connected to the wide-area communication network N2 such as Internet. The communication portion 15, by such a method as sending the image data attached to an e-mail, etc., can transmit and receive the image data to and from an Internet facsimile device 2 and the external PC 3 connected to the wide-area communication network N2, by way of the communication network N1 and the wide-area communication network N2. Therefore, the digital multi-function peripheral 1 can also serve as an Internet facsimile device.

An operation portion 12 for inputting by a user is connected to the machine control portion 14. The operation portion 12 has an input portion 12a such as a touch panel or a ten-key pad for inputting information such as a control command and a display portion 12b such as a liquid crystal display for displaying the information for operation. An authentication code, etc., for authenticating a manager or user of the digital multi-function peripheral 1 is also input at this operation portion 12. The authentication code is, in some cases, input from the outside by way of the FAX modem 18 or the communication portion 15.

Furthermore, a hard disk (HD) 16 is connected to the machine control portion 14. The HD 16 stores and retains the data related to image processing such as the image data generated by the image reading portion 11. The HD 16 is also connected to an erasing portion 19 that is connected to the machine control portion 14, and the erasing portion 19 erases the data stored and retained at the HD 16, as required. The machine control portion 14 connects with an image processing portion 20 equipped with a specific image information adding portion 20b for adding the specific image information and a specific image information detecting portion 20a for detecting the specific image information in the present invention.

The specific image information to be added to the image data is stored and retained beforehand at the specific image information adding portion 20b (or stored and retained at other accessible memory) and, by the control of the machine control portion 14, is temporarily memorized in the memory 13a in such a state that the specific image information is added to the image data. The image data retained in the memory 13a together with the specific image information is treated as a document provided with the specific image information (for example, copy prohibiting information), when printed on the recording paper at the printing portion 13b. In this case, the specific image information may be added in yellow (color machine) or gray (monochrome machine) in such a manner as not to be easily visible to the naked eye. Also when image forming is made at the printing portion 13b based on the image data read by way of the FAX modem 18 or the communication portion 15, the specific image information can be added by the specific image information adding portion 20b.

On the other hand, the image processing portion 20 has the specific image information detecting portion 20a for detecting whether the specific image information is contained in the image data read by the image reading portion 11. When the specific image information detecting portion 20a detects that the specific image information is contained in the image data, the machine control portion 14 executes the control, for example, to prohibit copying of the image data (to disable the image forming at the image forming portion 13).

Figure 2:
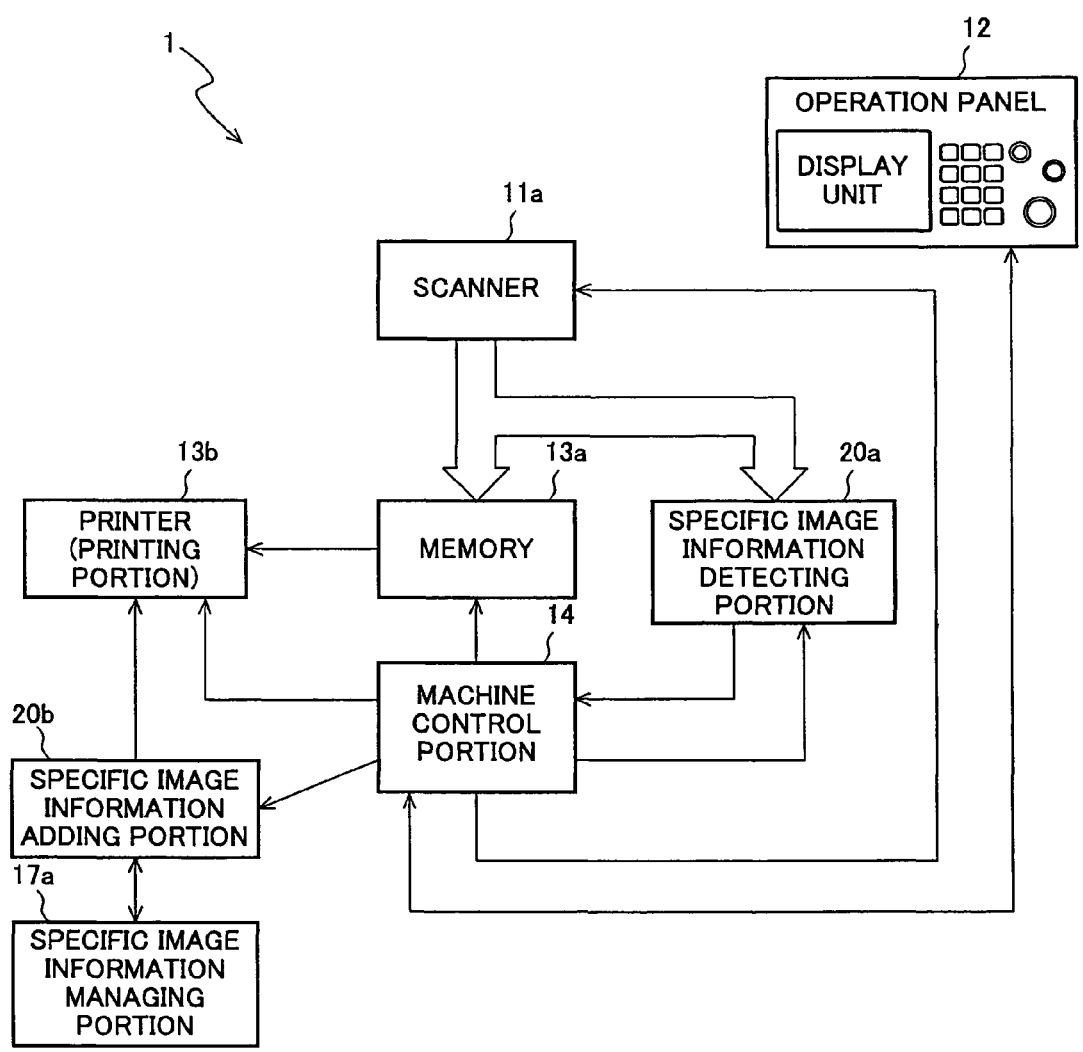
FIG. 2 is an explanatory block diagram of a schematic of adding of specific image information of FIG. 1.

FIG. 2 is an explanatory block diagram of a schematic of a configuration related to the addition of the specific image information of the present invention of FIG. 1. The digital multi-function peripheral 1 has an operation panel 12 for user's operation of printing, etc., after setting the document, etc., and a scanner 11a for reading the document. The image data of the document read by the scanner 11a is temporarily stored in the memory 13a and at the same time, the specific image information detecting portion 20a judges whether the specific image information is output to (whether the specific image information is included in) the image data of the document read by the scanner 11a.

The specific image information adding portion 20b adds predetermined specific image information to the image data stored at the memory 13a, based on predetermined conditions (for example, access right and processing route conditions) One or plural kinds of specific image information stored in a specific image information managing portion 17a are supplied to the specific image information adding portion 20b. The operation of adding the specific image information is performed by the printing portion (printer, etc.) 13b that outputs while adding (overlapping) the specific image information, based on the predetermined conditions described above, to the image data stored at the memory 13a and the machine control portion 14 that executes the control thereof.

Figure 3:
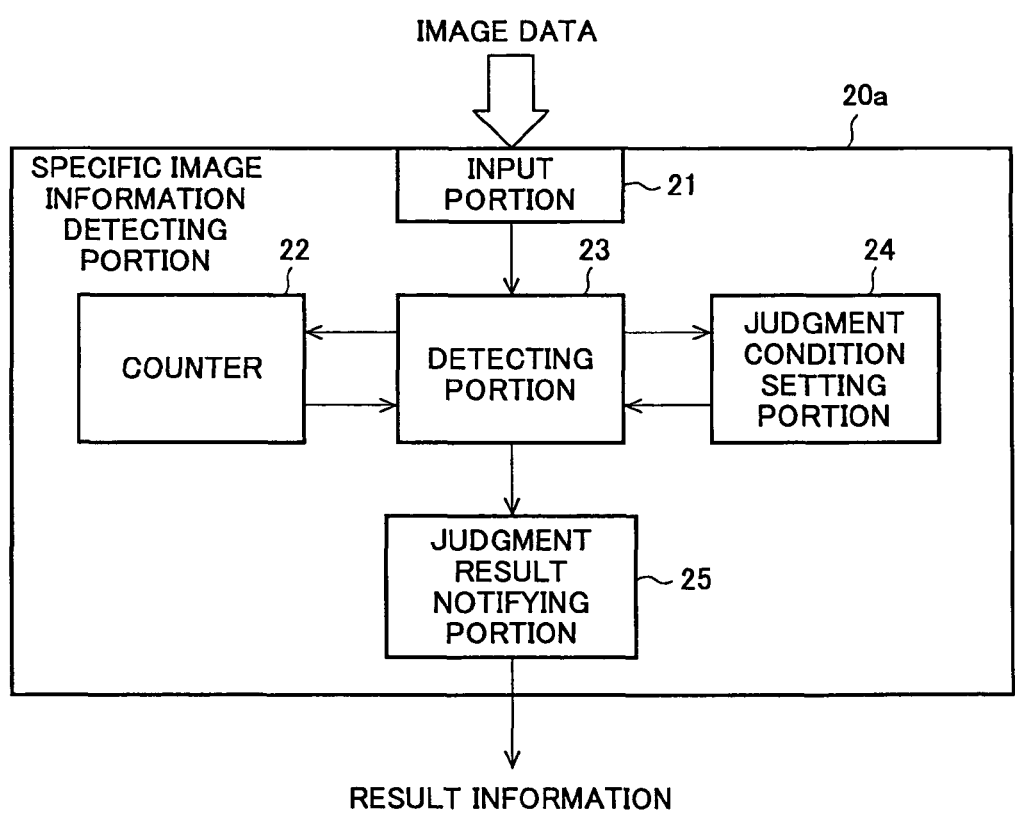
FIG. 3 is an explanatory block diagram of a schematic of a specific image information detecting portion of FIGS. 1 and 2.

FIG. 3 is an explanatory block diagram of a schematic of the specific image information detecting portion 20a as shown in FIGS. 1 and 2. The specific image information detecting portion 20a comprises an input portion 21 to which the specific image information read together with the image data is input and a detecting portion 23 that detects the specific image information out of input data. The specific image information detecting portion 20a further comprises a counter 22 that counts the number of times of detection of the specific image information detected at the detecting portion 23 to be described later and a judgment condition setting portion 24 that sets the condition for judging the specific image information at the detecting portion 23. If the specific image information detected at the detecting portion 23 is determined to be, for example, the copy prohibiting information, then the results are notified to the machine control portion 14 by way of a judgment result notifying portion 25, and the machine control portion 14 controls so that the copying of the image data is prohibited.

Figure 4A:
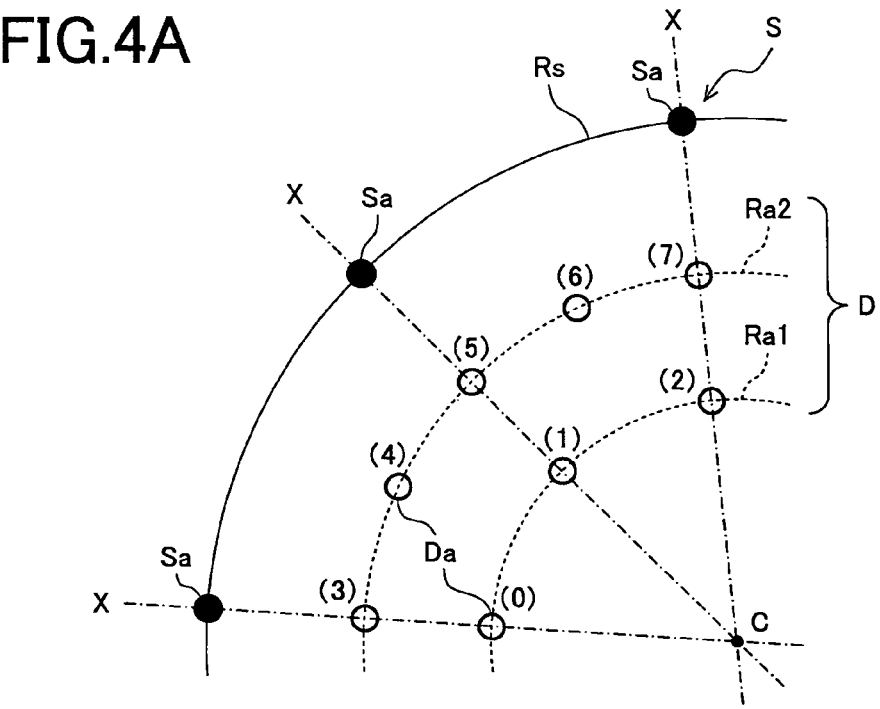
FIGS. 4A and 4B are explanatory diagrams of an example of specific image information to be added in the present invention.
Figure 4B:
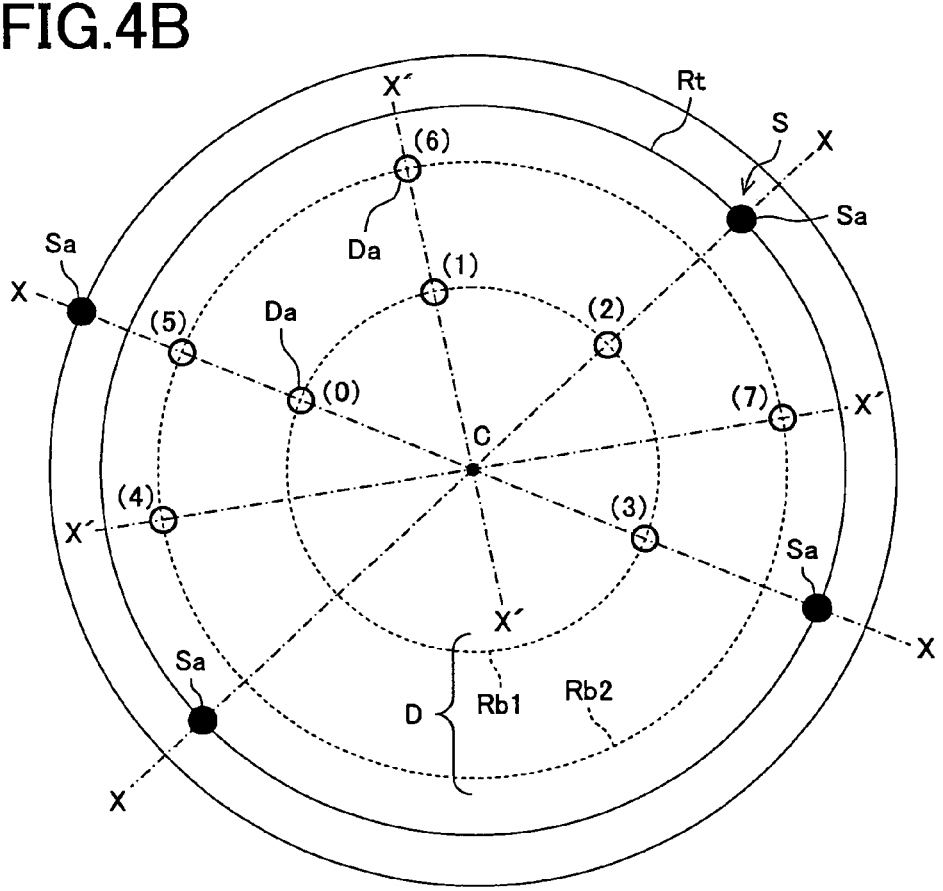

FIGS. 4A and 4B are explanatory diagrams of a schematic of specific image information of the present invention. FIG. 4A depicts an example where the specific image information is formed on arcs, while FIG. 4B depicts an example where the specific image information is formed on circumferences closing the arcs. As used herein, "arc" refers to a partial circle that is in the state of lacking part of a perfect circle, e.g., a quarter circle or a half circle, whose center coincides with the center of the perfect circle. "Circumference" means the perfect circle in the state of closing the arc described above, whose center refers to the center of the circle itself.

The specific image information of the present invention consists of reference information S and identification information D. These pieces of information are formed of one or more dot images, with one dot image being an image representable as a dot such as a circular shape, a rectangular shape, or a short line. The reference information S serves to set a reference position C of the specific image information and contains at least three dot images Sa formed on an arc Rs or a circumference Rt described around C to be set.

These three dot images enable the position of the center of the arc or the circumference to be specified (since the coordinates of the center of an arc or a circle passing through three different points not lying on a line are uniquely defined) so that this position of the center can be the reference position C of the specific image information. As shown in FIG. 4B, 2+2n (n: a positive integer) dot images Sa may be formed so that the intersection of lines X each joining two opposite dot images can be the reference position C of the specific image information. In this case, the plurality of dot images Sa need not lie on the same arc or the same circumference, and may be formed at any positions.

The identification information D contains dot images Da formed at predetermined positions on one or more arcs Ra1 and Ra2 or circumferences Rb1 and Rb2 indicated by broken lines around the reference position C. By forming the dot images Da so as to lie on the arcs Ra1 and Ra2 or on the circumferences Rb1 and Rb2, incomplete detections or read errors can be reduced even if a document is slightly tilted when detecting dot images Da from the document. This ensures a high-accuracy detection of the specific image information.

In the present invention, the dot images Da of the identification information D are represented by bit information that can be read in binary numbers of "0" or "1". To impart bit information of "0" or "1" to the dot images Da, for example "0" is assigned in the absence of the dot image Da, while "1" is assigned in the presence of the dot image Da. However, "0" in the absence of the dot image Da may possibly appear as a result of a read error of information. To avoid this, "0" may be assigned for example to the case where the number (indicating the size of an image) of pixels forming the dot image Da is small, whereas "1" may be assigned to the case where it is large. In another instance, the binary numbers may be assigned depending on colors forming the dot image Da, e.g., "0" to yellow, and "1" to cyan.

The dot images Da indicative of the identification information D are formed discretely at predetermined spacings on the plurality of concentric arcs Ra1 and Ra2 or concentric circumferences Rb1 and Rb2 so as to easily be read. For example, in case of forming one piece of specific image information from 8-bit (1-byte) identification information D, the dot images are formed at eight locations designated at (0) to (7) and are given the digits of "0" or "1". Note that one piece of specific image information may be represented by a smaller number of bits (e.g., 2 bits, 4 bits) or by a larger number of bits (e.g., 16 bits, 24 bits). In case of using more bits, the number of the concentric arcs Ra1 and Ra2 or of the concentric circumferences Rb1 and Rb2 is increased so as to prevent intervals between the adjacent dot images Da on the same arc or on the same circumference from becoming small resulting in a lower identification accuracy.

These dot images Da may lie on predetermined arcs or circumferences and simultaneously for example align on lines X passing through the dot images Sa of the reference information S and the reference position C, or may lie on lines X' passing through the reference position C intermediate between or spaced apart predetermined angular ranges from the lines X passing through the reference position C, although it is desirable that they be formed at positions that can easily be detected. It is also desirable that the identification information D be formed so as not to overlap image data of a document. To this end, it is desirable that the dot images Da be not aligned in the horizontal and vertical directions that are often used for ruled lines of a table, etc., in the document image data.

To read the identification information D consisting of the plurality of dot images Da as one piece of binarized data, the order of arrangement of the dot images Da needs to be set. The dot images Da at each position (0) to (7) are given as information to be read in the order of (0) to (7) when for example the position (0) is a starting end with the position (7) being a terminating end so that reading is made using the starting end dot image and the terminating end dot image as markings upon detection. The reference starting end (0) or terminating end (7) is positioned for example so as to lie on the lines X used to set the reference position C and on the innermost arc Ra1 or on the innermost circumference Rb1. However, the reference starting end (0) or terminating end (7) may lie at any positions as long as the order to read the dot images, etc., is set with definite starting and terminating positions of dot images as the identification information.

The above specific image information can be a diversity of different pieces of information by varying the state of binarization of the dot images Da even though the arrangements of the reference information S and the dot images Da of the identification information D and the pattern shapes added are the same. For example, the 8-bit binary numbers shown in the diagram can be represented as numerical values of 0 to 255 in decimal notation. By increasing the bit number to 16 bits (2 bytes) and 24 bits (3 bytes), etc., it becomes possible by oneself to directly represent contents of the specific image information, e.g., a document copy available limit, a serial number of a copying machine used, passwords of a document manager or a user, etc.

In case of using a plurality of concentric arcs or circumferences, different contents of information or associated contents of information may separately be given for each of the arcs or the circumferences. For example, in case of representing the copy available limit by three concentric circles, the form may be such that the innermost circumference indicates a date, the second innermost circumference indicates a month, and the outermost circumference indicates a year. In another instance, the innermost circumference may indicate the significance of a management item, with second innermost circumference indicating contents of management, the outermost circumference indicating a manager.

The dot images of both the reference information S and the identification information D can be formed as color images, and the dot images Sa of the reference information S may be distinguished from the dot images Da of the identification information D by employing different pixel numbers or by imparting different shapes to the dot images. However, by imparting different colors to the dot images of the reference information S and of the identification information D, it becomes possible to distinguish the dot images Sa from the dot images Da without changing the shapes or sizes of the dot images and to visually check them.

By adding the above specific image information, a multiplicity of different pieces of information (management information, etc.) can be added as hidden information to a single document. To avoid detection errors arising from dirt on the document or from the arrangement of the specific image information, however, it is desirable to form the same specific image information at a plurality of locations so that the detection results can become definite by detecting a predetermined number of pieces of same specific image information. For the specific image information indicative of significant information, it is desirable to add a larger number of pieces of specific image information than the other specific image information to prevent detection errors from occurring.

Figure 5A:
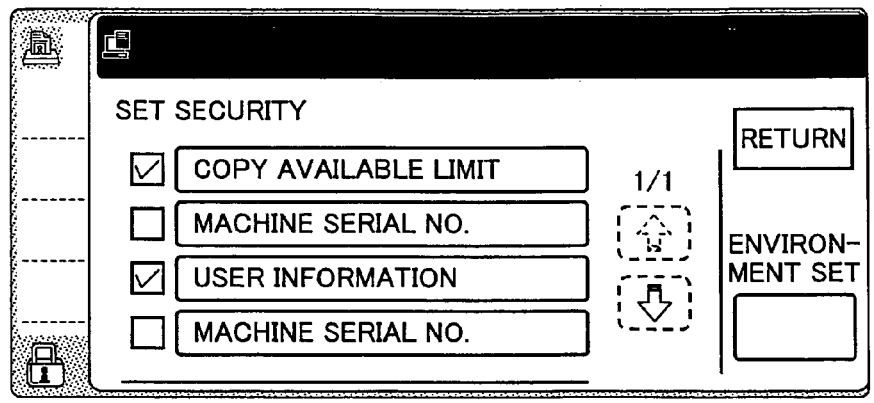
FIGS. 5A to 5C are diagrams of an example of operation screens for adding specific image information.
Figure 5B:
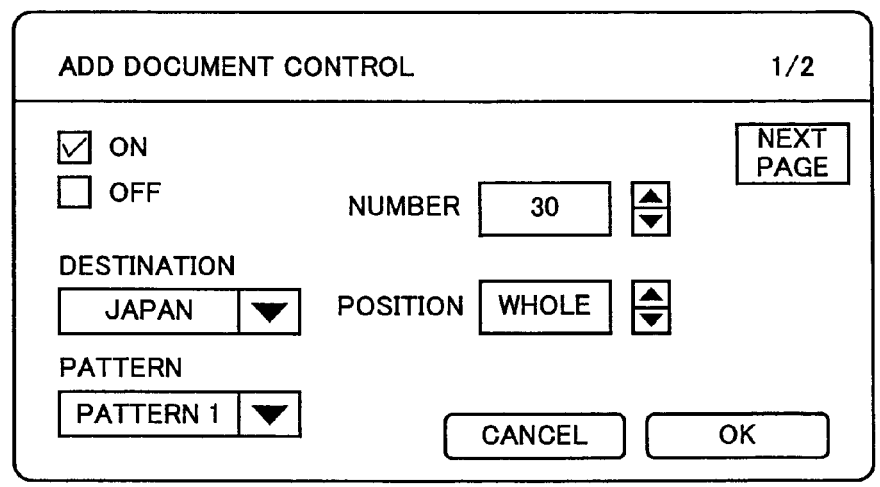
Figure 5C:
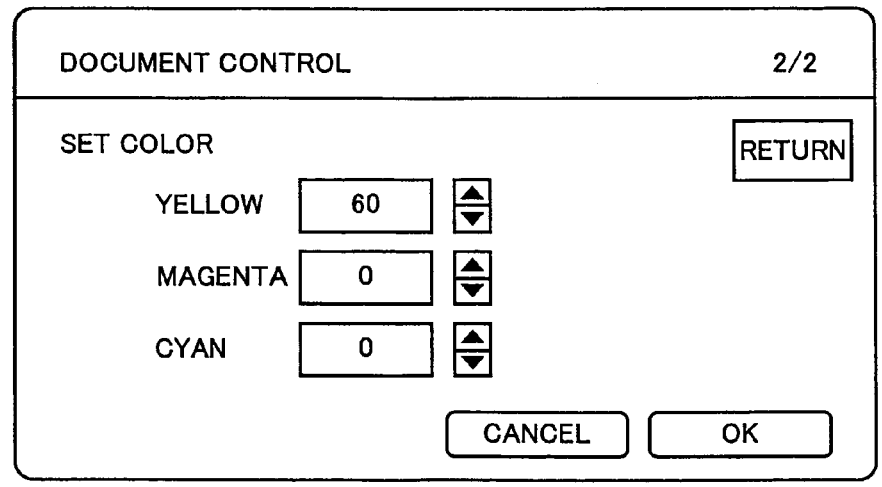

FIGS. 5A to 5C are diagrams of an example of user setting to add the above specific image information to an original document, the display is provided by a display portion 12b of an operation portion 12 of FIG. 1. FIG. 5A depicts an exemplary display screen for security setting on which the user selects management information such as a copy available limit, a serial number of the copying machine, and passwords of the manager and the user to place them as hidden information in the document. FIG. 5B depicts an exemplary display screen for document control setting on which the user selects whether to add copy prohibiting information or restraining information, or selects a pattern of the information, the number of pieces of information to be added, range (whole or part) of information to be added, etc. Further, using an exemplary display screen of FIG. 5C, the user selects, when adding document control information, in what color to add the information.

In a case where the specific image information is added to a major surface of a document, it is normally formed with an unobtrusive color (e.g., yellow) so as not to impede reading of the document. It may also be formed at inconspicuous locations as hidden information. The specific image information added in such a form is detected color by color through color filters of a specific image information detecting portion to be binarized so that a pattern shape is specified by pattern matching, etc., and that the content of the pattern is read to determine the content of the information.

Figure 6:
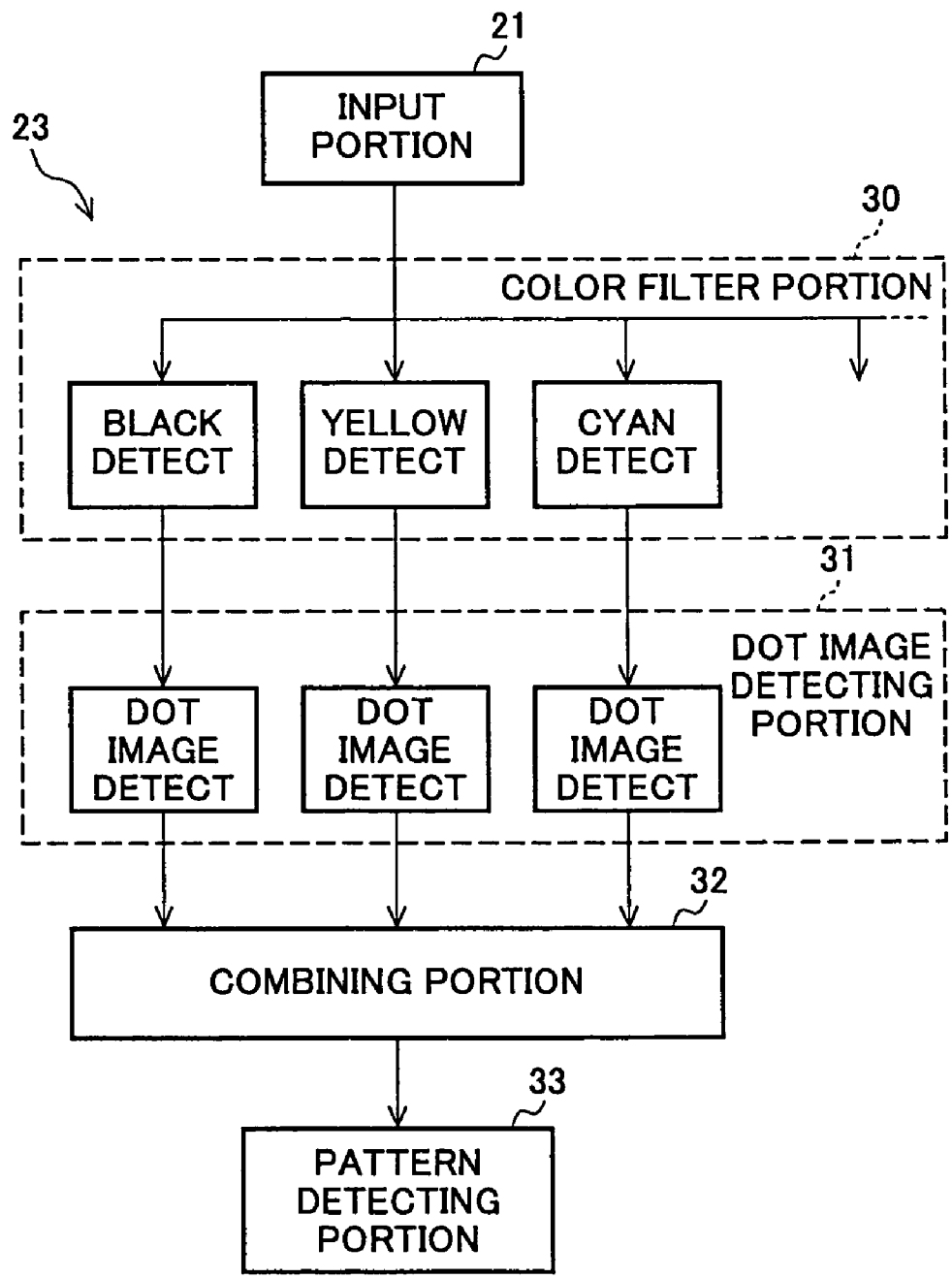
FIG. 6 is an explanatory block diagram of a detecting method of specific image information added in the present invention.

FIG. 6 is an explanatory diagram of an example of a detecting portion 23 that detects the added specific image information as described above. An input portion 21 of the specific image information detecting portion receives image data that includes image data of a document and specific image information added thereto. The detecting portion 23 is a portion that detects whether the specific image information such as management information and copy prohibiting information as shown in FIGS. 4A and 4B is present in the input image data. The detecting portion 23 includes a color filter portion 30, a dot image detecting portion 31, a combining portion 32, and a pattern detecting portion 33.

The color filter portion 30 includes a plurality of color filters for e.g., black detection, yellow detection, and cyan detection. The input image data is separated on a color-to-color basis by the color filter portion 30 to be extracted as binarized data. The data extracted on a color-to-color basis is fed to the dot image detecting portion 31 which in turn identifies predetermined shapes and sizes from e.g., continuity of the number of pixels making up the data, to detect only dot images added as specific image information. It is to be noted that the detected dot images can also be distinguished and detected by the shape (such as a circular shape, rectangular shape, triangular shape, etc.) or the size (pixel number) respectively.

Each detected dot image is combined by the combining portion 32 so that the position of the combined image is specified on coordinates. The resultant dot image pattern is detected by the pattern detecting portion 33 for each specific image information, separating the reference information S and the identification information D of the specific image information described with reference to FIGS. 4A and 4B.

Figure 7A:
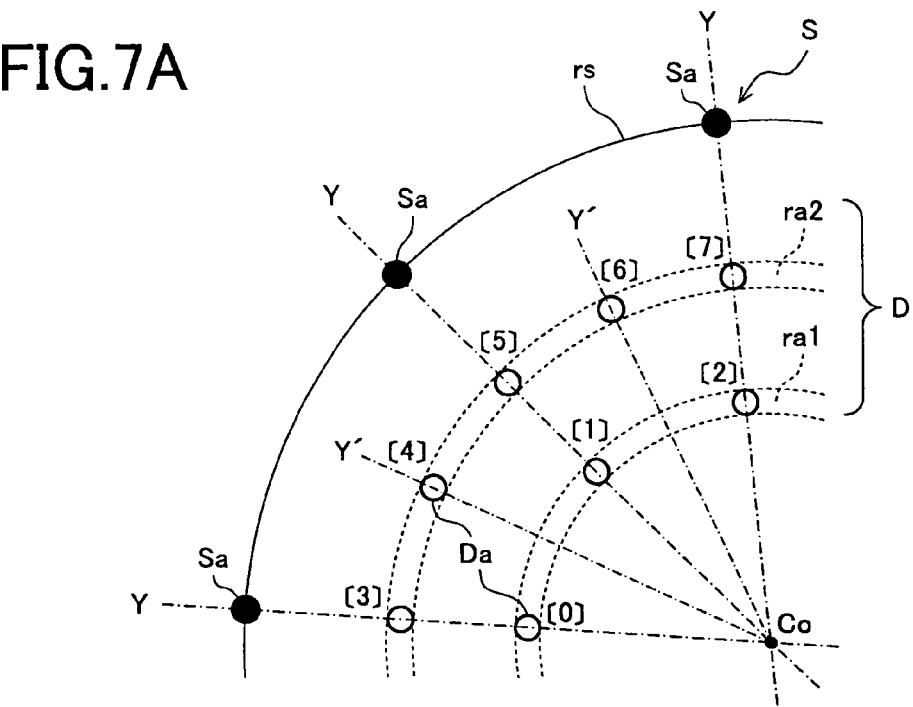
FIGS. 7A and 7B are explanatory diagrams of an example of a detecting method of specific image information added in the present invention.
Figure 7B:
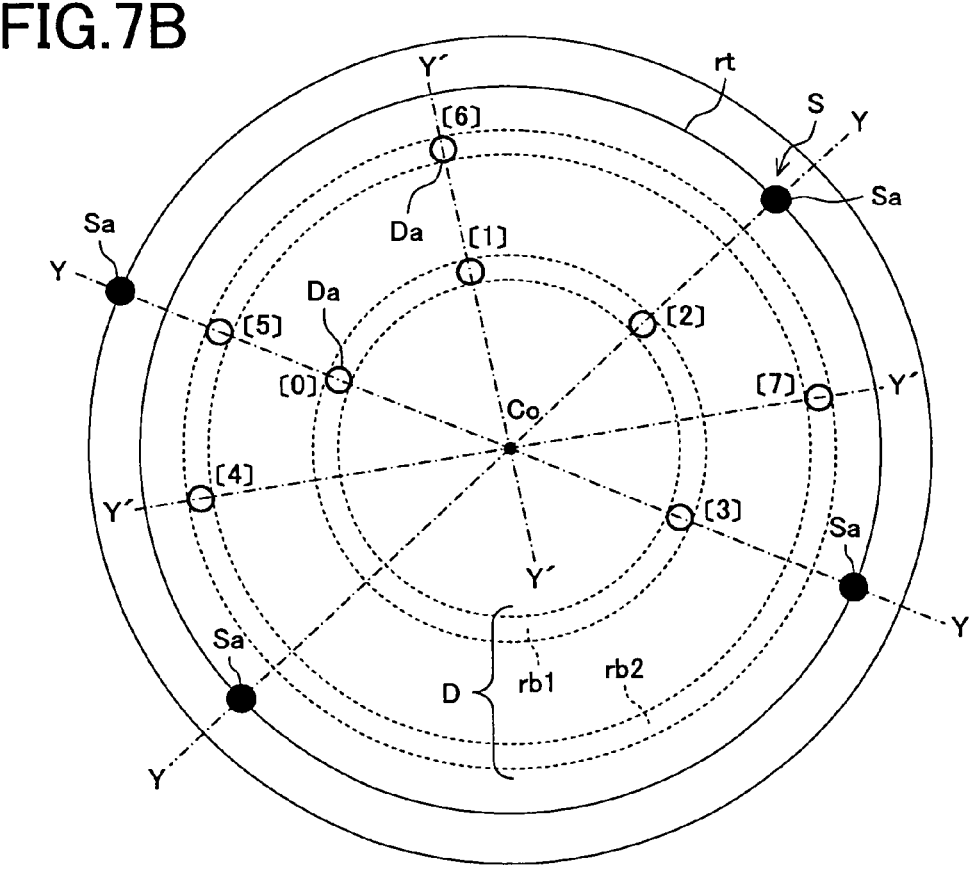

FIGS. 7A and 7B are explanatory diagrams of a method of detecting specific image information from the detected dot images and specifying the information content thereof. FIG. 7A depicts an example of detecting specific image information formed on an arc, while FIG. 7B depicts an example of detecting specific image information formed on a circumference. First, an arc rs or a circumference rt is defined by dot images Sa of the reference information S to detect a center position Co of the specific image information. In case of forming 2+2n (n: positive integer) dot images as shown in FIG. 7B, an intersection of lines Y joining two opposite dot images is detected as the center position Co of the specific image information. Next, assuming arcs ra1 and ra2 or circumferences rb1 and rb2 having predetermined radii around the center position Co, dot images Da are detected as the identification information D lying on the imaginary arcs or circumferences. Note that the dot images are selected from ones detected by the method of FIG. 6.

Specified as effective dot images Da are ones lying on the arcs ra1 and ra2 or the circumferences rb1 and rb2 having predetermined radii and lying on the predetermined lines Y or Y' passing through the center position Co. It is then judged whether each of the effective dot images Da is "0" or "1" of bit information. This judgment can use information on colors of the dot images or information on pixel numbers indicative of the shapes and the sizes of the dot images. Although no dot image is detected at a predetermined position when the information of "0" is represented by not adding the dot image for example, judgment in this case may be such that information of "0" is present due to the absence of the dot image at the predetermined position.

For the above judged dot images Da at predetermined positions, reading order is set as [0] to [7] for example, with the positions of the starting end [0] or the terminating end [7] being set on the predetermined lines Y passing through the predetermined dot images Sa of the reference information S and the center position Co. A single piece of specific image information is detected at a plurality of locations if necessary to confirm that predetermined specific image information is added, and it is further detected whether other specific image information is present. Information read by the binary base is converted to predetermined information items or is used as direction control information for image processing of the document or for copy prohibiting, etc.

According to the specific image information adding method of the present invention, dot images indicative of the reference information and the identification information can be formed from the same patterns even when they indicate different pieces of information. For this reason, the same detection patterns can be used to ensure easy and rapid detection of the specific image information. Use of the arc or circumference patterns as the detection patterns ensures high-accuracy detection of the specific image information even when the document is tilted. Forming the dot images of the specific image information from the bit information enables a lot of pieces of information that contain different management contents to be included in the same document.

As described above, the present invention enables the specific image information consisting of dot images indicative of bit information ("0" or "1") lying on the predetermined arcs or circumferences to be read and detected as digital information. Information with different contents can be represented by bit information even though image patterns of the specific image information are the same, thus enabling multiple types of specific image information easy to detect to be added to a single document. Since the specific image information is detected as bit information lying on the arcs or on the circumferences, easy detection is ensured even when the document is placed tilted, thus enhancing the detection accuracy.

The invention claimed is:

1. A method of adding specific image information about a recorded image onto the recorded image, the specific image information consisting of reference information and identification information, the method comprising:
    forming the reference information by a specific image information adding portion of an image forming apparatus so as to set a reference position for reading of the specific image information by forming at least three dot images on an arc around the reference position, the at least three dot images corresponding to the reference information that is used to set the reference position for subsequently forming the identification information; and
    forming the identification information by the specific image information adding portion, the identification information being formed as a plurality of dot images indicative of bit information at predetermined positions on a plurality of concentric circular arcs respectively around the reference position, the arcs having different distances (radii) from the reference position, and the dot images indicating a plurality of different information contents respectively.

2. The method of adding specific image information as defined in claim 1, wherein the arc is a circumference whose both ends are closed.

3. The method of adding specific image information as defined in claim 1 or 2, wherein the reference information and the identification information are formed with different colors.

4. The method of adding specific image information as defined in claim 1 or 2, wherein the same specific image information is added at a plurality of locations.

5. An image forming apparatus, comprising:
    a machine control portion including at least a memory for storing processing information;
    an image forming portion for forming image data on recording paper, the image forming portion being operably connected with the machine control portion; and
    an image processing portion comprising:
    a specific image information adding portion that adds specific image information about a recorded image onto the recorded image, the specific image information consisting of reference information and identification information, wherein the reference information is formed so as to set a reference position for reading of the specific image information by forming at least three dot images on an arc around the reference position, the at least three dot images corresponding to the reference information that is used to set the reference position for subsequently forming the identification information, and the identification information being formed as a plurality of dot images indicative of bit information at predetermined positions on a plurality of concentric circular arcs respectively around the reference position, the arcs having different distances (radii) from the reference position, and the dot images indicating a plurality of different information contents respectively; and
    a specific image information detecting portion that detects the specific image information.

6. The image forming apparatus of claim 5, wherein the arc is a circumference whose both ends are closed.

7. An image forming apparatus, comprising:
    a machine control portion including at least a memory for storing processing information;
    an image forming portion for forming image data on recording paper, the image forming portion being operably connected with the machine control portion; and
    an image processing portion comprising:
    a specific image information adding portion that adds specific image information about a recorded image onto the recorded image, the specific image information including reference information and identification information, wherein the reference information is formed so as to set a reference position for reading of the specific image information by forming at least three dot images on an arc around the reference position, the at least three dot images corresponding to the reference information that is used to set the reference position for subsequently forming the identification information, and the identification information being formed as a plurality of dot images indicative of bit information at predetermined positions on a plurality of concentric circular arcs respectively around the reference position, the arcs having different distances (radii) from the reference position, and the dot images indicating a plurality of different information contents respectively.

8. The image forming apparatus of claim 7, further comprising:
a specific image information detecting portion that detects the specific image information.

9. The image forming apparatus of claim 7, wherein the arc is a circumference whose both ends are closed.

* * * * *